C. WOOD.
MACHINE FOR HEADING GRAIN.
APPLICATION FILED MAR. 6, 1913.

1,100,514.

Patented June 16, 1914.
2 SHEETS—SHEET 1.

WITNESSES

INVENTOR
CHARLES WOOD,
BY Munn & Co.
ATTORNEYS

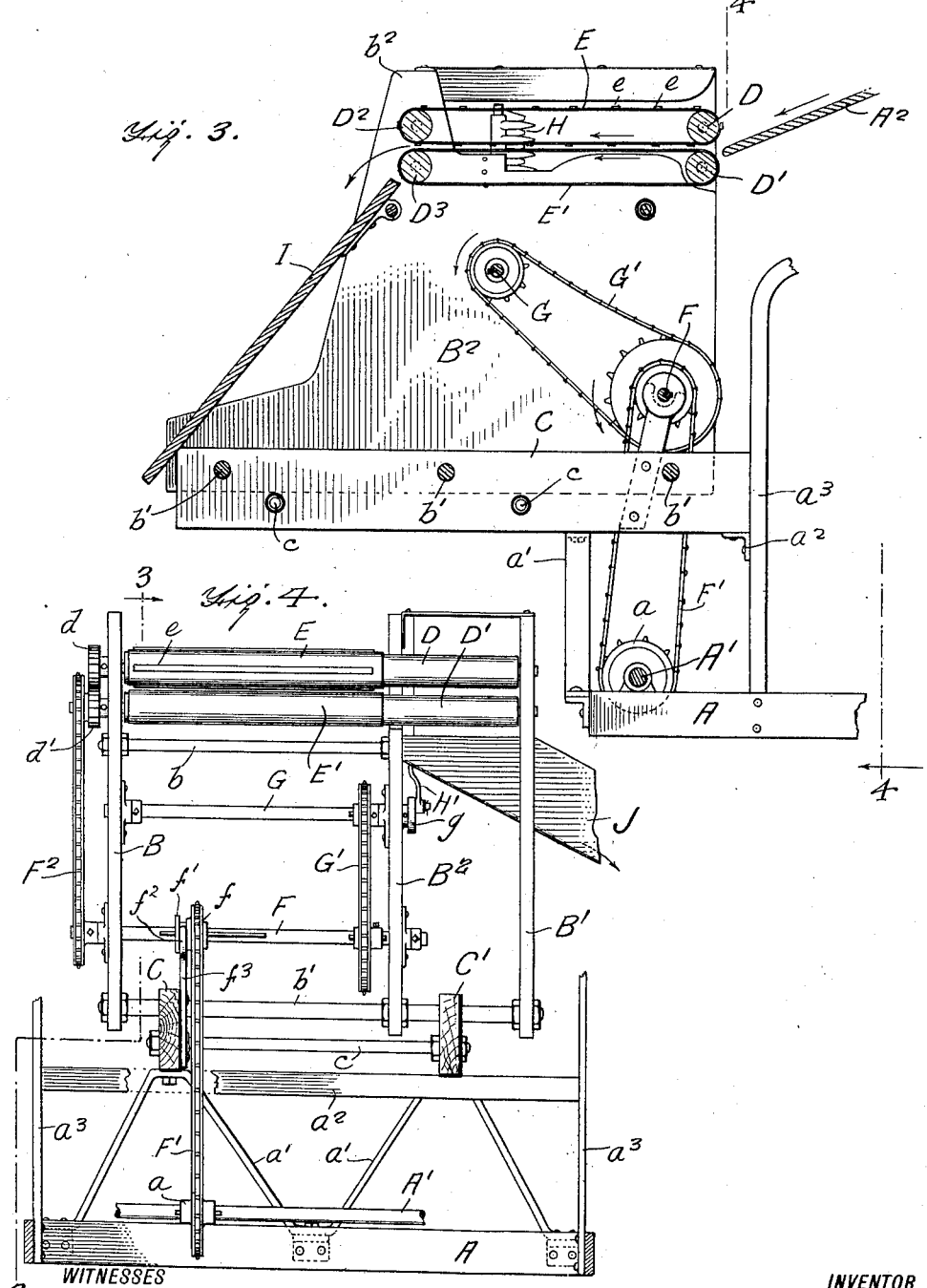

UNITED STATES PATENT OFFICE.

CHARLES WOOD, OF MOULTON, IOWA.

MACHINE FOR HEADING GRAIN.

1,100,514.  Specification of Letters Patent.  Patented June 16, 1914.

Application filed March 6, 1913. Serial No. 752,348.

*To all whom it may concern:*

Be it known that I, CHARLES WOOD, a citizen of the United States, and a resident of Moulton, in the county of Appanoose and State of Iowa, have made certain new and useful Improvements in Machines for Heading Grain, of which the following is a specification.

My invention relates broadly to grain heading apparatus, and more particularly to an apparatus adapted to perform this function in connection with a harvester and binder, my object being to provide such an apparatus as will be capable of receiving the laterally discharged grain from a harvester and binder with the binding devices removed, and head the grain thus received, discharging the stalks or straw in one direction and the grain heads in another direction.

A further object of my invention is to provide a simple and efficient apparatus which may be easily and freely adjusted, even during the practical operation, so as to adapt the same to grain of different lengths.

Figure 1:
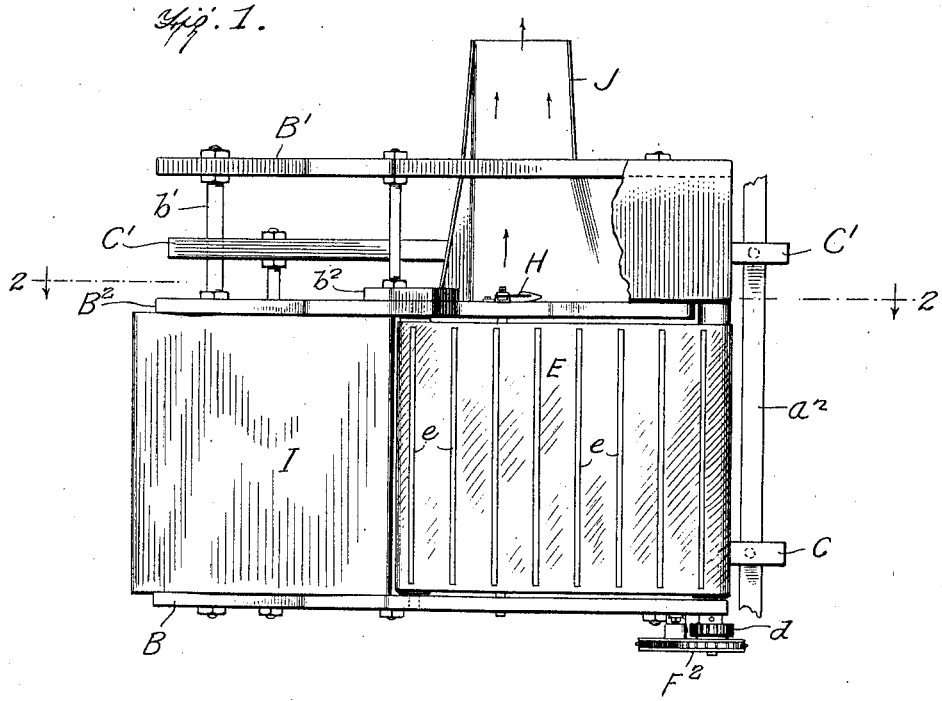
Figure 2:
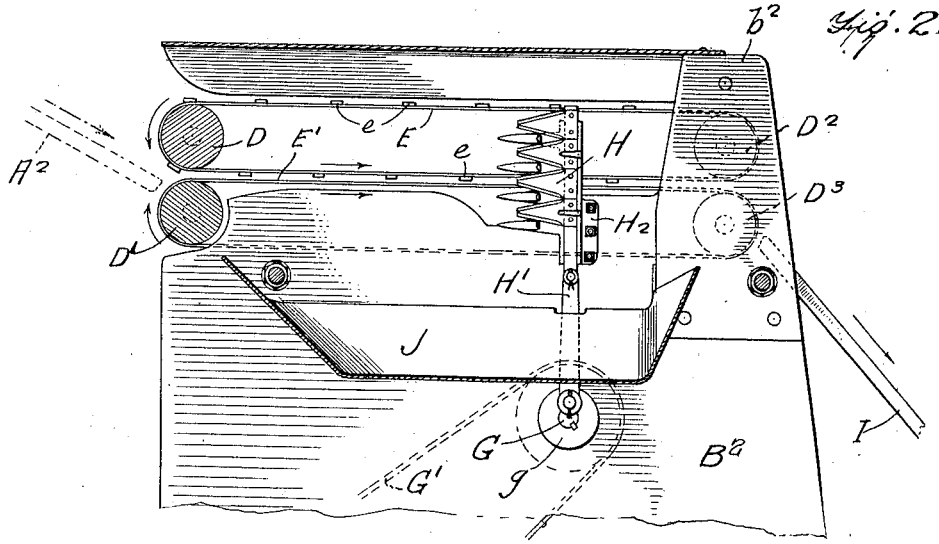

With these and other objects in mind, my invention resides in the apparatus shown in the accompanying drawings, in which:

Figure 1 is a plan view of my improvement; Fig. 2 is a transverse sectional view taken therethrough on the line 2—2 of Fig. 1, and looking forwardly; Fig. 3 is a vertical transverse sectional view taken through my improved apparatus substantially on the line 3—3 of Fig. 4 and looking rearwardly, the apparatus being shown as supported in connection with certain parts of the harvester and binder to be hereinafter specifically referred to; and, Fig. 4 is a sectional side elevation taken substantially on the line 4—4 of Fig. 3.

Referring now particularly to Figs. 3 and 4, A represents the main wheel frame of a combined harvester and binder, which as is well known, projects to one side of such machine and is supported by the main driving wheel (not shown), upwardly over which the cut grain is discharged by means of an inclined conveyer, the main wheel frame supporting a driven shaft A' which is directly connected with the main wheel before mentioned, and which shaft is, in accordance with my invention, provided with a rigid sprocket wheel $a$ intermediate its ends.

My improved apparatus embodies front and rear upright walls B and B' and an upright wall $B^2$ intermediate the walls B and B' and of reduced height, these three walls being spaced and connected by means of upper and lower bolts $b$ and $b'$ respectively, of which the lower bolts $b'$ extend loosely through parallel supporting beams C and C' which are rigidly spaced and connected by bolts $c$ and bolted adjacent one end to bridge pieces $a'$ supported upon and upstanding from the main wheel frame A and also bolted to a transverse bar $a^2$ connected to side uprights $a^3$ of the main wheel frame. Thus the walls B B' and $B^2$ which, with their connections constitute the frame of my improved apparatus, may be readily adjusted forwardly and rearwardly with respect to the movement of the harvester in connection with which my improvements operate, so as to adjust the frame to properly receive grain of different lengths discharged thereinto from the inclined conveyer before mentioned, upon an inclined discharge plate $A^2$.

Journaled in superposed relation at the receiving side of my improved header, and extending between the front and rear walls B and B' over the intermediate wall $B^2$ are a pair of rollers D and D', each of which receives thereover the forward portion of its respective apron E or E', the rear portions of which are carried by rollers $D^2$ and $D^3$ superposed in the opposite side of the frame and journaled in the wall B and the upwardly extending side portion $b^2$ of the intermediate wall $B^2$.

As particularly indicated in Figs. 1 and 4, the aprons E and E' extend only between the walls B and $B^2$ and between these aprons, of which the apron E is provided with transverse slats $e$, the stalks of the grain are conveyed, the heads of the grain extending rearwardly over the intermediate wall $B^2$.

Journaled through the lower portions of the walls B and $B^2$ at the receiving side of the apparatus is the main shaft F, intermediately upon which is splined a sprocket wheel $f$ having an annularly grooved side piece $f'$ into the groove of which extends a yoke $f^2$ at the upper end of a supporting member $f^3$, the lower end of which is secured to the supporting beam C. This sprocket wheel $f$ is connected to the sprocket wheel $a$ previously described, by a sprocket chain $F'$ and, by the supporting means just described, the said sprocket wheel $f$ is maintained in vertical alinement with the sprocket wheel $a$ when the header frame is adjusted with respect to the supporting beams C and C'.

At its forward end, the shaft F is provided with a sprocket wheel connected, by means of a sprocket chain $F^2$, to a sprocket wheel mounted upon the forward end of the roller D', this roller being connected to the roller D above the same, by means of intermeshing gears $d$ and $d'$ whereby to effect the rotation of these rollers and movement of the aprons E E'. The shaft F is also provided with a sprocket wheel adjacent its rear end which is connected, by means of a sprocket chain G' to a shaft G journaled through the walls B and $B^2$ above and to one side of the shaft F, the shaft G being provided at its rear end with a crank disk $g$ to the crank pin of which is connected the lower end of a pitman H', the upper end of which is connected to the lower end of the cutter bar H, this bar reciprocating vertically in its cutter frame $H^2$ upon the rear surface of the upper portion of the wall $B^2$ at an intermediate point. Thus through the connections stated, the cutter bar H is reciprocated so as to cut off the heads of the grain carried sidewise through the frame, the stalks of which are moved between the aprons E and E' and subsequently discharged laterally upon the inclined discharge plate I.

Secured to the rear surface of the intermediate wall $B^2$ and extending through the rear wall B' is an inclined chute J, positioned below the cutter H and adapted to receive the grain bearing heads after they are cut, and to discharge the same into any suitable receptacle (not shown) which may be supported by other connections from the main wheel frame A of the harvester.

I claim:

1. The combination with a grain harvesting machine having horizontally projecting supporting beams, of a grain heading apparatus consisting of spaced upright walls, a grain conveyer operating horizontally between the upper portions of the walls, a vertically reciprocatory cutter for removing the heads of the grain projecting at one side of the conveyer and a plurality of transverse bolts rigidly spacing and connecting the several walls of the heading apparatus and loosely mounted through the supporting beams of the harvester whereby to permit of adjustment of the heading apparatus for the purpose described.

2. The combination with a grain harvesting machine having horizontally projecting supporting beams, of a grain heading apparatus consisting of spaced upright walls, a conveyer operating horizontally between the upper portions of the walls, a vertically reciprocatory cutter for removing the heads of the grain projecting at one side of the conveyer, a shaft journaled through the lower portions of certain of the upright walls, a driving member splined on the shaft, transverse bolts rigidly connecting the walls of the apparatus, certain of which bolts are loosely mounted through the supporting beams of the harvesting machine whereby to permit of adjustment of the heading apparatus, and arms projecting upwardly from one of the supporting beams and having their upper ends extending upon opposite sides of the said driving member for the purpose described.

3. In a grain heading apparatus, the combination of a frame, a horizontal conveyer operating in the frame, a vertical cutter for removing the heads of the grain projecting from the said conveyer, supporting beams upon which the said frame is adjustably mounted, a shaft journaled in the frame and having connection with the said conveyer and cutter for actuating the same, and a driving member splined on the said shaft and means connecting the said driving member with one of the said supporting beams whereby to prevent its movement with the frame when the latter is adjusted.

4. In a grain heading apparatus, the combination of a frame consisting of a pair of upright walls and a wall intermediate the first-mentioned walls, and bolts rigidly spacing and connecting the upper and lower portions of said walls, parallel supporting beams rigidly connected and through which the lower connecting bolts of the frame are loosely mounted, superposed rollers mounted between the upper portions of the upright walls, traveling aprons supported by the said rollers and extending between the intermediate wall and one of the first-mentioned walls, a vertically reciprocatory cutter mounted on the intermediate wall and adapted to remove the heads of grain projecting beyond the said aprons, a grain chute supported by the walls below the cutter, and a driven shaft journaled through certain of the walls and having connection with the cutter and certain of the apron rollers, all for the purpose described.

5. The combination with a harvester having a main wheel frame extending to one side thereof, and a driven shaft supported by the said main wheel frame, of supports upstanding from the said main wheel frame, a pair of laterally extending beams secured to and projecting from the said upright supports of the said main wheel frame, a frame comprising spaced upright walls having connections rigidly spacing them apart and adjustably mounted through the said beams, a horizontal conveyer mounted in the frame so as to receive cut grain from the discharging conveyer of the harvester, a cutter for removing the heads of the grain projecting from the said conveyer, and connections for actuating the said conveyer and the said cutter, extending from the driven shaft of the main wheel frame of the harvester, all for the purpose described.

CHARLES WOOD.

Witnesses:
S. J. C. EBY,
J. P. POWELL.

---

Copies of this patent may be obtained for five cents each, by addressing the "Commissioner of Patents, Washington, D. C."